(12) United States Patent
Zosel

(10) Patent No.: US 11,066,183 B2
(45) Date of Patent: Jul. 20, 2021

(54) GROUND HANDLING FACILITY AND METHOD FOR PASSENGER-TRANSPORTING AIRCRAFT

(71) Applicant: Volocopter GmbH, Bruchsal (DE)

(72) Inventor: Alexander Zosel, Rheinstetten (DE)

(73) Assignee: Volocopter GmbH, Bruchsal (DE)

( * ) Notice: Subject to any disclaimer, the term of this patent is extended or adjusted under 35 U.S.C. 154(b) by 0 days.

(21) Appl. No.: 16/626,392

(22) PCT Filed: Jul. 24, 2017

(86) PCT No.: PCT/EP2017/068602
§ 371 (c)(1),
(2) Date: Dec. 24, 2019

(87) PCT Pub. No.: WO2019/020158
PCT Pub. Date: Jan. 31, 2019

(65) Prior Publication Data
US 2020/0130863 A1 Apr. 30, 2020

(51) Int. Cl.
*B64F 1/00* (2006.01)
*B64F 1/04* (2006.01)
(Continued)

(52) U.S. Cl.
CPC ............... *B64F 1/00* (2013.01); *B64F 1/005* (2013.01); *B64F 1/04* (2013.01); *B64F 1/22* (2013.01);
(Continued)

(58) Field of Classification Search
CPC .... B64F 1/00; B64F 1/005; B64F 1/04; B64F 1/22; B64F 1/222; B64F 1/31; B64F 1/32; B64F 5/40
(Continued)

(56) References Cited

U.S. PATENT DOCUMENTS 3,785,316 A 1/1974 Leming et al.
4,098,036 A * 7/1978 Spoler .................. B61B 1/02
104/28

(Continued)

FOREIGN PATENT DOCUMENTS

JP H07207625 8/1995

*Primary Examiner* — Patrick J Maestri
*Assistant Examiner* — Joseph J. Sadlon
(74) *Attorney, Agent, or Firm* — Volpe Koenig

(57) ABSTRACT

A ground handling facility (1) for passenger-transporting aircraft (100), in particular vertical takeoff and landing multicopters, including: at least one first platform (2) which is designed as a landing platform (2) for a passenger-transporting aircraft (100), wherein a) the at least one first platform is simultaneously designed as a takeoff platform for a passenger-transporting aircraft (100), or b) wherein a second platform (3) is provided which is designed as a takeoff platform (3) for a passenger-transporting aircraft (100); at least one region (4) which is designed as weather protection for the passengers and the aircraft (100), in particular by provision of a canopy; and at least one conveying device (5.1; 5.2; 5.3) for the aircraft (100) that is designed to move the aircraft (100) from the landing platform (2) through the region (4) to the takeoff platform (3), in which region there is provided at least one station (6.1-6.4) which is configured for a predetermined interaction with the aircraft (100).

31 Claims, 7 Drawing Sheets

(51) Int. Cl.
  *B64F 1/22* (2006.01)
  *B64F 1/31* (2006.01)
  *B64F 1/32* (2006.01)
  *B64F 5/40* (2017.01)

(52) U.S. Cl.
  CPC .................. *B64F 1/31* (2013.01); *B64F 1/32* (2013.01); *B64F 5/40* (2017.01)

(58) Field of Classification Search
  USPC ............................................................ 52/30
  See application file for complete search history.

(56) References Cited

U.S. PATENT DOCUMENTS

| | | | | |
|---|---|---|---|---|
| 4,176,732 A * | 12/1979 | Nordskog | .............. | A61G 3/063 187/200 |
| 6,129,026 A * | 10/2000 | LeCroy | .................. | B64F 1/322 104/88.01 |
| 8,783,192 B2 * | 7/2014 | Smith | ..................... | B60L 13/10 104/282 |
| 9,056,676 B1 * | 6/2015 | Wang | ........................ | B60R 9/00 |
| 9,284,062 B2 * | 3/2016 | Wang | ...................... | B60L 53/52 |
| 9,359,783 B1 * | 6/2016 | Josdal | ..................... | E04H 15/18 |
| 9,387,940 B2 * | 7/2016 | Godzdanker | ............. | E01F 3/00 |
| 9,394,060 B2 * | 7/2016 | Brody | ..................... | B64F 1/222 |
| 9,481,458 B2 * | 11/2016 | Casado Magana | ... | B60L 3/0046 |
| 9,505,493 B2 * | 11/2016 | Borko | ....................... | B64F 1/12 |
| 9,513,371 B2 * | 12/2016 | Zhang | ..................... | B60L 53/80 |
| 9,527,605 B1 * | 12/2016 | Gentry | ................. | G05D 1/0094 |
| 9,536,216 B1 * | 1/2017 | Lisso | ..................... | G01C 21/20 |
| 9,579,679 B2 * | 2/2017 | Mathis | ...................... | B64F 5/30 |
| 9,771,148 B2 * | 9/2017 | Cox | ...................... | B64C 25/405 |
| 9,777,502 B2 * | 10/2017 | Curlander | ................. | B64F 1/10 |
| 9,815,633 B1 * | 11/2017 | Kisser | .................. | B25J 9/0093 |
| 10,054,958 B2 * | 8/2018 | Creasman | ................ | B64C 9/00 |
| 10,124,912 B2 * | 11/2018 | Walsh | ........................ | B64F 1/04 |
| 10,252,820 B2 * | 4/2019 | Seckel | ..................... | F24F 11/30 |
| 10,287,033 B2 * | 5/2019 | Hu | ............................. | B64F 1/02 |
| 10,717,529 B2 * | 7/2020 | Russo | ..................... | A01K 59/00 |
| 2003/0102407 A1 * | 6/2003 | Wood | ........................ | B64F 1/04 244/114 R |
| 2014/0252168 A1 * | 9/2014 | Brody | ..................... | B64F 1/005 244/114 R |
| 2015/0251751 A1 * | 9/2015 | Cox | ...................... | B64C 25/405 244/114 B |
| 2017/0197710 A1 | 7/2017 | Ma | | |
| 2019/0300172 A1 * | 10/2019 | Di Benedetto | ........ | H04N 5/772 |

* cited by examiner

GROUND HANDLING FACILITY AND METHOD FOR PASSENGER-TRANSPORTING AIRCRAFT

TECHNICAL FIELD

The invention relates to a ground handling facility for passenger-conveying aircraft, in particular vertical takeoff and landing multicopters.

The invention furthermore relates to a building, in particular high-rise building, having at least one ground handling facility according to the invention.

The invention furthermore relates to a method for the ground handling of passenger-conveying aircraft, in particular vertical takeoff and landing multicopters.

The applicant is a pioneer in the field of manned air travel with electrically powered multicopters. These are vertical takeoff and landing aircraft which have a multiplicity of electrically driven rotors and which are particularly easy and safe to fly. Automated flight operation (without a pilot) is also easily possible. Such aircraft have the potential of revolutionizing specifically inner-city traffic in urban conurbations in the future and counteracting an impending transport collapse.

Since the applicant has developed the first aircraft of the stated type to the point of series-production readiness, there is now the objective, which also forms the basis for this invention, to create a corresponding infrastructure to make the practical use of the stated aircraft efficient and inexpensive.

In particular if it is sought, with a necessarily limited number of aircraft, to ensure fast and frictionless flight operation with a realistic volume of passengers, there is correspondingly a demand for a suitable ground handling facility for passenger-conveying aircraft of the stated type in order that these can be used as efficiently as possible.

SUMMARY

The present invention achieves this object through the creation of a ground handling facility for passenger-conveying aircraft, through the creation of a building having a ground handling facility, and through the specification of a method for the ground handling of passenger-conveying aircraft having one or more features of the invention. Advantageous refinements of the concept according to the invention are described below and in the claims.

A ground handling facility according to the invention for passenger-conveying aircraft, in particular vertical takeoff and landing multicopters, has: at least one first platform, which is designed as a landing platform for a passenger-conveying aircraft, wherein a) the at least one first platform is simultaneously designed as a takeoff platform for a passenger-conveying aircraft, or b) at least one second platform is provided which is designed as a takeoff platform for a passenger-conveying aircraft; at least one region which is designed as a weather protection area for passengers and the aircraft, in particular through the provision of a covering roof; at least one transport or conveying device for the aircraft, which is designed to move the aircraft from the landing platform through the region to the takeoff platform; in which region there is provided at least one station which is configured for a predefined interaction with the aircraft.

Here and below, the stated aircraft are preferably, and without restriction, electrically powered multicopters. However, this term encompasses all aircraft that can be used in manned operation (which can self-evidently also be flown in unmanned operation when required). Somewhat more specifically, the application may encompass all aircraft with the characteristic of being able to take off and land vertically—irrespective of whether they are powered by an electric drive, a combustion drive, a fuel cell or the like. Also encompassed more generally, aside from the stated multicopters, are helicopters or other embodiments, such as for example transforming aircraft (swing-wing aircraft, tilt-rotor aircraft, flying automobiles etc.).

A building according to the invention, in particular high-rise building, is distinguished by at least one ground handling facility according to the invention, which ground handling facility is arranged preferably on the roof or in the roof region of the building.

A method according to the invention for the ground handling of passenger-conveying aircraft, in particular vertical takeoff and landing multicopters, comprises: i) providing an aircraft on a first platform, which serves as a landing platform for a passenger-conveying aircraft; ii) transporting or conveying the aircraft from the landing platform into at least one region or to a region which serves as a weather protection area for the passengers and the aircraft, in particular through the provision of a covering roof, by at least one transport or conveying device for the aircraft; iii) conveying the aircraft through the region by the at least one conveying device, in which region a predefined interaction with the aircraft takes place at at least one station; iv) conveying the aircraft out of the region to a takeoff platform for the aircraft by the at least one conveying device.

According to the invention, provision is accordingly made whereby the ground handling of passenger-conveying aircraft is made particularly efficient by virtue of these being moved (transported or conveyed) from a landing platform to a takeoff platform, wherein, on the way from the landing platform to the takeoff platform, the aircraft pass through a particular region which is designed firstly as a weather protection area for the passengers and the aircraft and in which, secondly, there is provided at least one station at which operations are or can be performed on the aircraft. Because the aircraft, after landing, thus does not remain at the landing location (on the landing platform) but rather is moved into the stated region, the landing platform is subsequently immediately available again for another aircraft, in order to ensure highly efficient flight operation. The operations on the aircraft at said station, which will be discussed in more detail further below, are performed in the protected region, whereby, firstly, the aircraft is protected and, secondly, a considerable increase in comfort can be realized for the passengers. After the stated interaction with the aircraft in the protected region, said aircraft is moved to the takeoff platform in order to subsequently convey passengers to a predetermined destination.

Here, in a first variant of the ground handling facility according to the invention, provision may be made whereby one single physical platform serves simultaneously as takeoff platform and as landing platform. The aircraft is then moved away from the landing platform (into the protected region) and subsequently moved from the protected region back to the same platform, which then functions as takeoff platform. In this way, only one single takeoff and landing platform has to be provided, which reduces the outlay in terms of construction.

It is however preferable if, according to another variant of the ground handling facility according to the invention, two different platforms serve as takeoff platform and landing platform respectively. In this way, the cycle frequency of the flight operation can be increased, because the landing platform is not intermittently blocked by an aircraft that is taking off.

As already stated further above, the protected region may be formed as a protected region by virtue of a covering roof being provided. Said region may however also be entirely closed off with respect to the surroundings by virtue of not only a covering roof but also side walls and possibly closable openings (doors) for the entry and exit of the aircraft being provided.

Another refinement of the ground handling facility according to the invention provides for the at least one station to be designed as at least one of the following stations:

removal station for the removal of at least one power supply unit of the aircraft, in particular of a storage battery;

insertion station for the insertion of at least one power supply unit of the aircraft, in particular of a storage battery;

charging station for charging or refilling at least one power supply unit of the aircraft, in particular of a storage battery or of a fuel cell or of a combustion engine (long extender);

embarking station for the embarking of passengers into the aircraft;

disembarking station for the disembarking of passengers from the aircraft;

loading station for the loading of goods for transport into the aircraft;

unloading station for the unloading of goods for transport from the aircraft;

maintenance station for the technical maintenance of the aircraft;

transferring-out station for the transfer of the aircraft out of the conveying device;

transferring-in station for the transfer of an aircraft into the conveying device.

In this way, a very wide variety of operations can be performed on the aircraft in the protected region.

Since the multicopters discussed are generally electrically powered aircraft, it is particularly preferable for a removal station for the removal of at least one power supply unit of the aircraft to be provided, which power supply unit is generally in the form of a storage battery. The aircraft possibly has multiple such power supply units, such that it is correspondingly also possible for a multiplicity of such units to be removed at the removal station. Correspondingly, there is preferably at least one insertion station in order to be able to insert fresh (fully charged) power supply units into the aircraft in place of the removed power supply units.

In addition or alternatively, it is also possible for a charging station for charging or refilling at least one power supply unit to be provided. In this context, it is for example possible for use to be made of fast charging methods in order to charge the power supply unit directly on the aircraft while the latter is situated in the protected region. If the aircraft has a fuel cell or a combustion engine (range extender), provision may also be made for filling of such power supply units with corresponding (liquid) fuel.

Furthermore, the ground handling facility according to the invention may comprise at least one embarking station which is designed for enabling passengers to embark into the aircraft. Conversely, it is also possible for at least one disembarking station to be provided in order to enable passengers to disembark from the aircraft. In the context of the invention, it is also possible that the passengers remain seated during the transport in the aircraft if, for example, it is only necessary for the power supply units to be exchanged in order to increase the range of the aircraft.

Analogously to the embarking station and disembarking station, it is also possible for a loading and an unloading station for goods for transport to be provided. A maintenance station that is possibly provided serves for the technical maintenance of the aircraft. Furthermore, the ground handling facility may also comprise a transferring-out station for the transfer of the aircraft out of the conveying device if said aircraft is damaged or is intended to (temporarily) no longer participate in flight operation for other reasons. Correspondingly, a transferring-in station may be provided in order to transfer a (new) aircraft into the conveying device.

The transferred-out aircraft may be stored (set down or parked) in a particular region of the ground handling facility, for example if, at night, no flight operation or limited flight operation is to be maintained. A transferring-out or storage of the aircraft may also be expedient in the case of adverse weather conditions.

A particularly advantageous refinement of the ground handling facility according to the invention provides for multiple stations of the above-described type to be provided in the protected region, which stations may be arranged in series in a conveying direction of the conveying device. Preferably, in a particular embodiment of the ground handling facility, there are at least a disembarking station and an embarking station, which may be flanked by at least a removal station and an insertion station.

It has proven to be particularly advantageous, in another refinement of the ground handling facility according to the invention, for the conveying device to be designed as a multi-part conveying device. In this way, in certain sections of the ground handling facility, a conveying movement of the aircraft can be realized which is adapted to the respectively present circumstances.

In this context, a particular embodiment of the ground handling facility according to the invention provides that the conveying device comprises at least a first conveying device, a second conveying device and a third conveying device, wherein the first conveying device is designed for conveying the aircraft from the landing platform to the or into the region, wherein the second conveying device is designed for conveying the aircraft through the region, and wherein the third conveying device is designed for conveying the aircraft out of or from the region to the takeoff platform. In this way, by use of the first to third conveying devices, it is possible for operations to be performed on an aircraft differently in the stated sections of the ground handling facility, which increases the flexibility of use of the ground handling facility overall.

In a logical further development of this concept, provision may be made whereby at least the first conveying device and the third conveying device, on the one hand, and the second conveying device, on the other hand, are designed differently, in particular have different conveying speeds, wherein the first conveying device and the third conveying device preferably have a higher conveying speed than the second conveying device.

In this way, it is for example possible for the landing and flight departure cycle frequency to be increased, because, by the first conveying device and the third conveying device, the aircraft can be moved relatively quickly away from the landing platform and toward the takeoff platform. By contrast, the second conveying device, which is designed for conveying the aircraft through the protected region, can operate with a considerably slower conveying speed, in order to thereby permit a variety of interactions with the aircraft in the protected region.

In this context, in another refinement of the conveying device according to the invention, provision may also be made whereby the conveying device or at least one of the conveying devices is designed for moving the aircraft in a continuous manner, for example in order to transport said aircraft quickly and smoothly away from the landing platform into the protected region and thus increase the cycle frequency.

Additionally or alternatively, provision may be made whereby the conveying device or at least one of the conveying devices is designed for moving the aircraft in a discontinuous manner. This preferably relates to the second conveying device, which moves the aircraft through the protected region. In this way, the aircraft can be brought to a standstill at each of the individual stations, for example in order to enable passengers to embark easily, or in order to simplify the loading and unloading of the aircraft. In this context, the aircraft need not be braked entirely to a standstill; rather, it is also possible for the aircraft, at least in the stated region, to be moved with alternately relatively fast and relatively slow conveying speeds, which may furthermore be adapted to the respective station purpose or to the type of interaction there.

In order, with the aid of the proposed ground handling facility, to also permit handling of aircraft which cannot take off and land vertically, it is possible, in another refinement of the ground handling facility according to the invention, for provision be made whereby a braking device for a non-vertically landing aircraft is provided in the region of the landing platform, preferably by virtue of the conveying device, in the region of the landing platform, being designed or usable as a braking device for a non-vertically landing aircraft. If an incoming aircraft has a certain non-zero horizontal landing speed, the braking device may be used to counteract this speed and just compensate said speed. In the simplest case, the conveying device provided in the region of the landing platform may be used for this purpose, if the conveying direction thereof can be (temporarily) reversed.

This refinement may also be provided in the region of the takeoff platform in order to accelerate an aircraft which takes off non-vertically during takeoff. In the simplest case, the conveying device provided in the region of the takeoff platform may be used for this purpose, if the conveying speed thereof can be (temporarily) increased. In addition or alternatively, a dedicated accelerating device for a non-vertically landing aircraft may be provided in the region of the takeoff platform.

Another refinement of the ground handling device according to the invention provides for the protected region to be arranged on a different horizontal plane, in particular on a lower plane, than the takeoff and/or landing platform. Thus, if the ground handling facility is arranged for example on a building roof, it is possible in this way for the protected region to be arranged within the building below the roof plane. The takeoff and/or landing platform is, by contrast, situated on an elevated plane, which may be advantageous in particular due to wind turbulence that generally arises at buildings.

As already discussed, another refinement of the ground handling facility according to the invention provides for said ground handling facility to be arranged or arrangeable on a building, in particular on a high-rise building. Here, the takeoff and/or landing platform may be arranged or arrangeable in an overhanging manner in relation to the building.

The ground handling facility may extend over multiple levels, for example over three to five levels. Specifically, the stored, parked or set-down aircraft may in this case be arranged on lower levels. For the purposes of transport, elevator devices or the like may be provided. The ground handling facility may be arranged on an existing structure (high-rise building) or else on a structure erected specifically for the purpose, which has been created for example as a stilt-type construction above existing facilities of the (transport) infrastructure or superstructure.

In order to be able to utilize a spacing between the landing platform and the takeoff platform as efficiently as possible for the proposed interaction with the aircraft, it has proven to be expedient for the protected region itself, and/or a course of the conveying device in said region, to be of meandering form. In this way, it is possible to increase the effective length of travel between the takeoff and landing platforms, which may be advantageous in particular due to the structurally restricted situation in the roof region of (existing) buildings.

It has already been pointed out that, in another advantageous refinement of the ground handling facility according to the invention, at least one further station for the removal of the aircraft from the conveying facility may be provided, which station may be situated in particular in the protected region. Said station has already also been referred to, further above, as transferring-out station/transferring-in station.

For the transport or conveying device provided in the context of the ground handling facility according to the invention, numerous embodiments are possible. It has however proven to be particularly advantageous for the conveying device or at least one of the conveying devices to be designed as a conveyor belt, for example similarly to that in a baggage handling facility, in the form of robots or automated handling units, as a towing device, as a pushing device, in the form of carriages or the like. Consideration may basically also be given to locomotion of the aircraft in the form of a cableway and by contactless magnetic levitation methods or the like.

In the context of the present invention, however, consideration may basically also be given to the aircraft being designed to be self-propelling, that is to say for the conveying device not only to serve for actively transporting the aircraft but also to be of purely passive design as a mere movement path.

Advantageously, in a refinement of the ground handling facility according to the invention, a conveying speed of the conveying device and/or a distance of the protected region from the landing platform is selected or selectable such that an aircraft can be removed from the landing platform, and preferably conveyed into the region, within a first time starting when said aircraft lands, which first time preferably amounts to less than one minute, most preferably approximately 30 seconds. In this way, it is possible for aircraft to land and take off with a cycle frequency of 30 seconds. This permits a highly efficient configuration of the flight operation. The same preferably applies to the distance (the conveying time) between the region and takeoff platform.

In yet another refinement of the ground handling facility according to the invention, provision is made whereby a conveying speed of the conveying device is selected or selectable such that an aircraft can be conveyed through the protected region within a second time, which second time preferably amounts to less than five minutes, most preferably approximately 4 minutes. In tests performed by the applicant, it has been found that a time of only 4 minutes can be sufficient to make a landed aircraft ready for takeoff again and to enable the passengers to embark and disembark. After the stated time in the protected region, a given aircraft is then ready for takeoff again and can be transported by the conveying device to the takeoff platform.

Advantageously, in a specific refinement, the ground handling facility according to the invention comprises a guiding device in the region of the landing platform, which guiding device may preferably be designed as an electromagnetic, contactless guiding device. Said guiding device is designed and serves to guide a landed aircraft into a region of action of the conveying device in the region of the landing platform. This may in particular be the first conveying device mentioned further above, if the conveying device is of multi-part form. In this context, the guiding device may interact in contactless fashion for example with flight control electronics of the aircraft in order that said aircraft lands on the landing platform in such a way that it can subsequently be directly taken on and transported away by the conveying device. This prevents an "incorrectly" landed aircraft from blocking the landing platform or the need to use ground personnel to move the aircraft to the conveying device.

In a modification of, or as an addition to, the concept mentioned further above, it is also possible, in a further refinement of the ground handling facility according to the invention, for provision to be made whereby an additional conveying device is provided in the region of the landing platform, which additional conveying device is designed to feed a landed aircraft to the actual conveying device, in particular the abovementioned first conveying device. In this way, it is not of crucial importance for the aircraft to land exactly at a predetermined point (for example in the center) on the landing platform. This may be advantageous in particular if, owing to wind influences or other weather conditions, it is not possible to unequivocally ensure that the aircraft always sets down exactly at the same location on the landing platform.

In a refinement of the building according to the invention, provision may be made whereby said building has an elevator or a staircase or a similar facility as access to the ground handling facility, in particular to the protected region. In this way, passengers have easy access, in the stated region, to an embarking station, in order to embark into the aircraft there.

It has proven to be particularly advantageous if a building according to the invention, for the refinement thereof, has at least two ground handling facilities which are arranged on mutually opposite sides of the building. These ground handling facilities preferably have respectively separate takeoff/landing platforms, which are most preferably arranged in each case on a building roof. In this way, the available space in the roof region of buildings can be utilized particularly efficiently in the context of the present invention.

Another refinement of the building according to the invention provides for the takeoff and/or landing platform(s) to be arranged or arrangeable in an overhanging manner in relation to the building, in order to minimize adverse wind influences (turbulence). In this context, provision may be made whereby the stated platforms are designed to be capable of being retracted or extended or capable of being folded in or out, in order to be able to safely stow them for example in the event of a storm or the like.

A first refinement of the method according to the invention for the ground handling of passenger-conveying aircraft provides that the aircraft is conveyed initially relatively quickly away from the landing platform to the region or into the region, is subsequently conveyed relatively slowly through the region, and is then conveyed relatively quickly out of the region or away from the region to the takeoff platform. In this context, "relatively slowly" and "relatively quickly" are always in relation to the transport speeds to the or away from the protected region, on the one hand, and in the/through the protected region, on the other hand. The particular advantages of such an embodiment have already been referred to further above. In particular, it is thus possible to realize flight operation with a relatively fast cycle frequency, because the takeoff and landing platforms can be occupied and freed up again relatively quickly. By contrast, the aircraft can remain in the protected region for a relatively long time in order to be able to perform the maintenance, the embarking/disembarking and the like in a moderate length of time.

Yet another refinement of the method according to the invention, which has likewise already been referred to, provides that an aircraft is removed from the landing platform, preferably by being conveyed into the region, within a first time starting when said aircraft lands, which first time preferably amounts to less than one minute, and most preferably only approximately 30 seconds. It has correspondingly also been referred to that, in yet another embodiment of the method, an aircraft is conveyed through the region at a second side, which second time preferably amounts to less than 5 minutes, and most preferably even only approximately 4 minutes. A person skilled in the art readily identifies that the invention is not restricted to the numerical values stated merely by way of example above, which are always dependent on the specific usage situation.

At the latest when a landed aircraft is situated in the protected region, said landing platform can be utilized again for an aircraft.

Other refinements of the method according to the invention provide for an aircraft to be conveyed through the region in continuous fashion, or for an aircraft to be conveyed through the region in discontinuous fashion, wherein, preferably, a stoppage may be initiated, or a movement with a slowed conveying speed occurs, in the region of the at least one station. This, and the corresponding advantages, have also already been discussed further above.

In step iii) of the method according to the invention, in a corresponding refinement thereof, provision may be made whereby at least one of the interactions with the aircraft stated below takes place:

removal of at least one power supply unit of the aircraft, in particular of a storage battery;
insertion of at least one power supply unit of the aircraft, in particular of a storage battery;
charging or refilling at least one power supply unit of the aircraft, in particular of a storage battery or of a fuel cell or of a combustion engine;
embarking of passengers into the aircraft;
disembarking of passengers from the aircraft;
loading of goods for transport into the aircraft;
unloading of goods for transport from the aircraft;
technical maintenance of the aircraft;
transfer of the aircraft out of the conveying device;
transfer of an aircraft into the conveying device.

This has also already been referred to further above with reference to the corresponding embodiment of the ground handling facility.

As stated further above, it has proven to be particularly advantageous if the refinement of the method according to the invention a landing aircraft is guided into a region of action of the conveying device by a guiding device, preferably an electromagnetic, contactless guiding device, in the region of the landing platform, so that subsequent transport away from the landing platform is ensured.

BRIEF DESCRIPTION OF THE DRAWINGS

Further characteristics and advantages of the invention will emerge from the following description of exemplary embodiments on the basis of the drawing.

DETAILED DESCRIPTION

Figure 1:
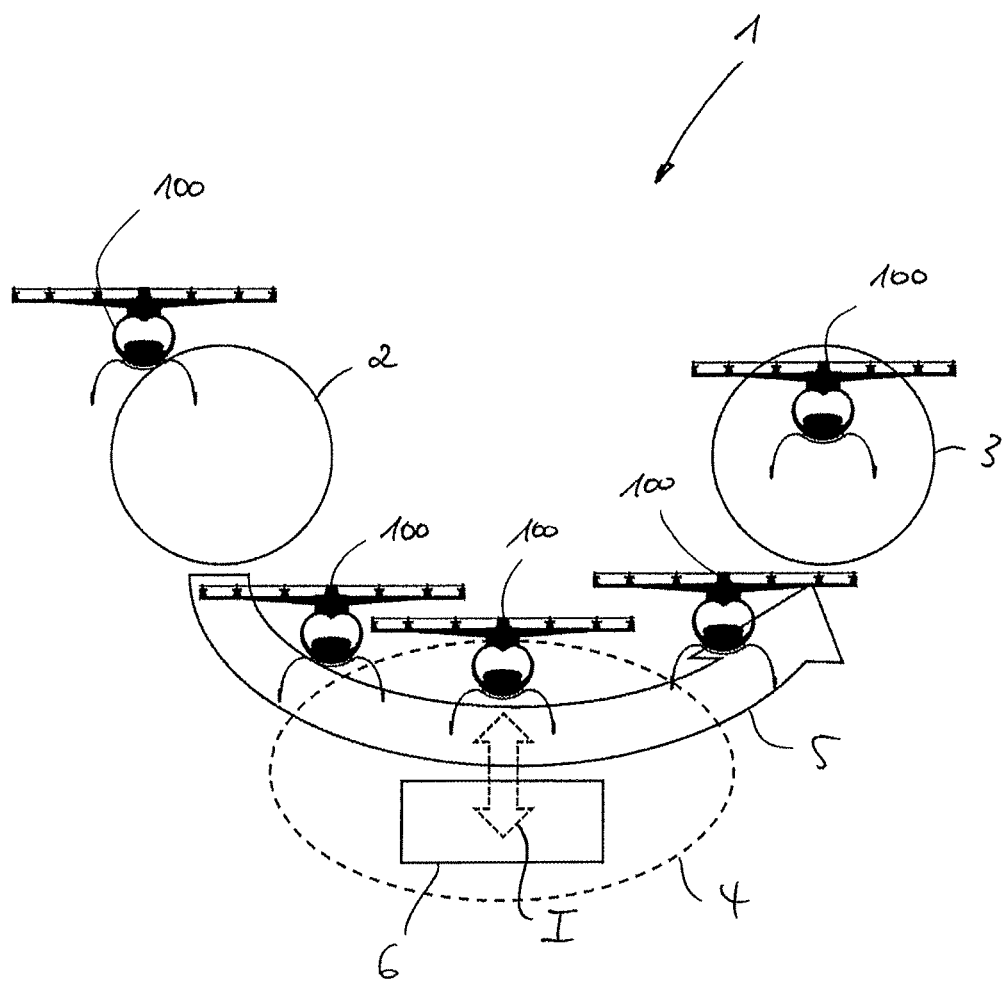
FIG. 1 shows a simplified schematic illustration of a ground handling facility according to the invention together with a number of passenger-conveying aircraft.

In FIG. 1, a ground handling facility according to the invention for passenger-conveying aircraft, in particular for vertical takeoff and landing, preferably electrically driven multicopters, is denoted as a whole by the reference designation 1. The ground handling facility 1 comprises a first platform 2, which is designed as a landing platform for the aircraft, and a second platform 3, which is designed as a takeoff platform for the aircraft. The aircraft themselves are not the subject of the invention, and are each denoted in the Figures by the reference designation 100.

Between the two platforms 2, 3, there is situated a special region which, in the context of the present description, will also be referred to as "protected region" and is denoted by the reference designation 4 (dashed line in FIG. 1). Said region 4 is designed as a weather protection area for the passengers and the aircraft 100 when these are situated in the stated region 4, for which purpose, in particular, a covering roof may be provided. The protected region 4 is however preferably a fully enclosed region to which access is provided by openable and closable doors, gates or the like, which is not illustrated in FIG. 1.

Furthermore, the ground handling facility 1 comprises a conveying device for the aircraft 100, which conveying device is symbolically illustrated by a curved arrow and is denoted by the reference designation 5. Possible embodiments of the conveying device 5 will be discussed in more detail further below. It must ultimately be designed and suitable for transporting the aircraft 100 from the landing platform 2 to the takeoff platform 3. In this context, it is not necessary for the transport to be realized actively by the conveying device 5, because the aircraft 100 may basically also be designed to be self-propelling (with wheels or the like). It is however preferred that the conveying device 5 actively acts on the aircraft 100 in order to transport these from the landing platform 2 through the protected region 4 to the takeoff platform 3. For this purpose, the conveying device 5 may for example be designed in the manner of a conveyor belt, without the invention being restricted to this.

It is basically not necessary for the landing platform 2 and the takeoff platform 3 to be physically separate units. Rather, it falls within the scope of the invention for a single platform to function both as takeoff platform 3 and as landing platform 2. The conveying device 5 must then be correspondingly configured such that it can transport the aircraft 100 away from said platform, through the protected region 4 and back to the same platform again. However, to ensure flight operation with a faster cycle frequency, it is preferable for the landing platform 2 and the takeoff platform 3 to be designed as separate platforms, as illustrated.

The conveying device 5 thus runs through the protected region 4, such that the aircraft 100 pass into said region 4. There, there is arranged at least one station 6 which is configured for a predefined interaction with the aircraft 100 which is situated at the stated station 6 due to the movement and specification by the conveying device 5. Said interaction is symbolically illustrated in FIG. 1 by a dashed double arrow I.

In the context of the invention, a multiplicity of different stations 6 may be realized in the protected region. This has already been referred to in detail further above, such that there is no need for a repetition at this juncture. In the following FIGS. 2 and 3, certain types of stations 6 will be discussed in more detail. It is advantageous if, in the protected region 4, there is not only a single station 6 as is illustrated by way of example in FIG. 1, but rather, at a multiplicity of stations 6, correspondingly different interactions I with the aircraft 100 are possible.

After the interaction I with the aircraft 100 has taken place at the station 6, the aircraft 100 moves onward, in accordance with the specification by the conveying device 5, in the direction of the takeoff platform 3, from which said aircraft takes off in order to participate in flight operation again.

Figure 2:
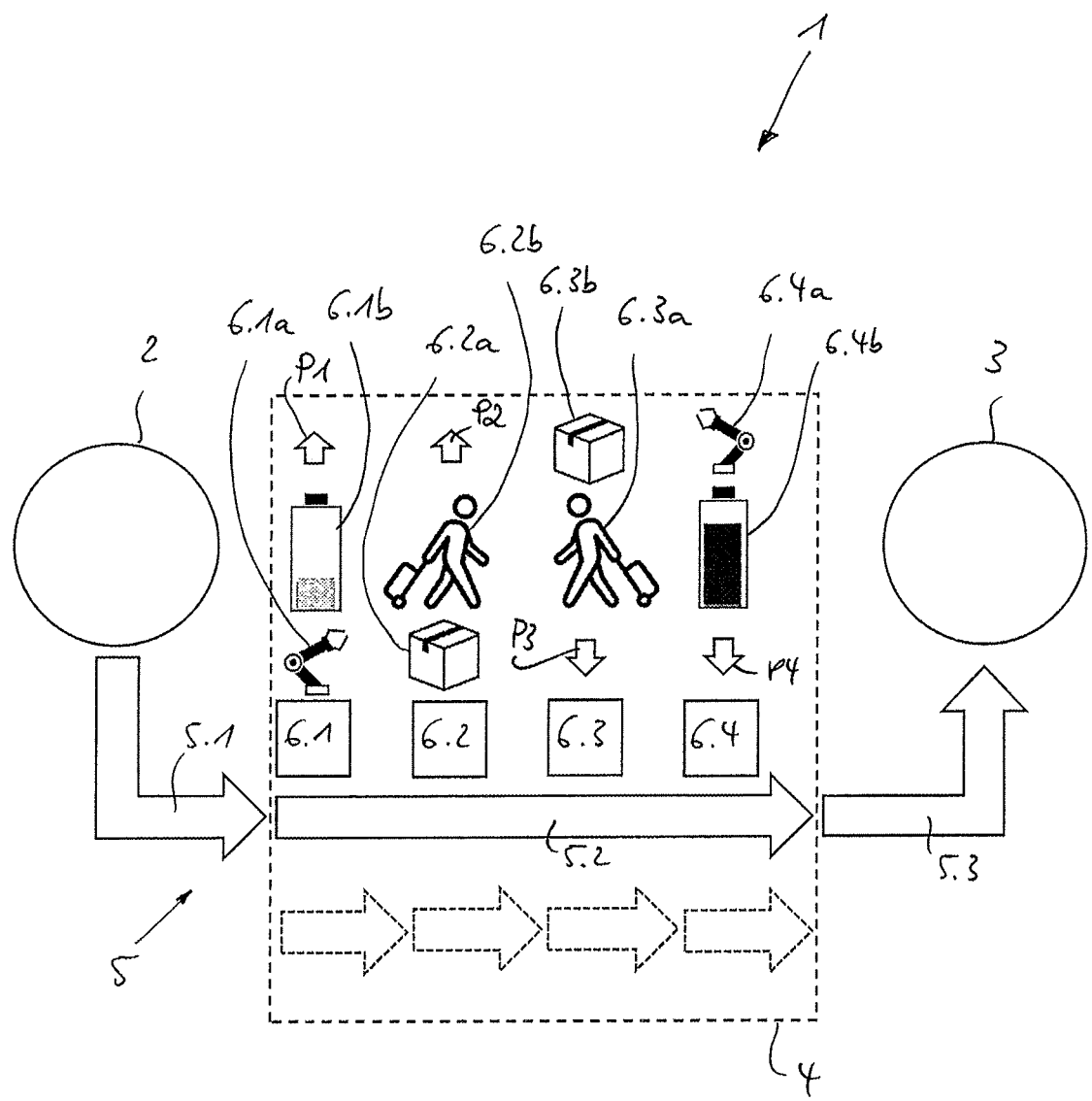
FIG. 2 schematically shows a possible special embodiment of a ground handling facility according to the invention.

FIG. 2 shows a special embodiment of the ground handling facility 1 according to the invention, wherein, for the sake of clarity, an explicit illustration of the aircraft 100 (see FIG. 1) has been omitted. Otherwise, the same reference designations are used in all Figures for the same elements or elements with the same action.

A first major difference in relation to the embodiment as per FIG. 1 consists in that, in FIG. 2, the conveying device 5 is of multi-part, in particular three-part, form. This is symbolized in FIG. 2 by the fact that, instead of a single arrow, three arrows with reference designations 5.1, 5.2, 5.3 are illustrated. Reference designation 5.1 denotes a first conveying device, reference designation 5.2 denotes a second conveying device, and reference designation 5.3 denotes a third conveying device. The first conveying device 5.1 is designed to transport a landed aircraft (not shown) from the landing platform 2 to or into the protected region 4, as illustrated. The specific transport path is not important here, though may be designed to be as short as possible. The second conveying device 5.2 is arranged in the protected region 4 and serves for transporting an aircraft (not shown) through said region 4. At the end of the region 4, the second transport device 5.2 then transfers the aircraft to the third transport device 5.3, which is provided for the (direct) onward transport to the takeoff platform 3.

In the protected region 4, the illustrated ground handling facility 1 as per FIG. 2 comprises not only one station 6, but rather four stations, which are denoted by the reference designations 6.1 to 6.4. The stations 6.1 to 6.4 are arranged in series along the second transport device 5.2, such that, by the second transport device 5.2, the aircraft (not shown) can be transported to the stations 6.1 to 6.4 in succession. Above the individual stations 6.1 to 6.4, it is symbolically illustrated which interactions with the aircraft (can) take place at the respective stations 6.1 to 6.4.

In the illustrated embodiment in FIG. 2, the station 6.1 constitutes a removal station for the removal of at least one power supply unit of the aircraft, in particular of a storage battery in the case of electrically powered aircraft. For this purpose, at the station 6.1, a robot 6.1*a* is provided which removes the (empty) power supply unit 6.1*b* from the aircraft (arrow P1). A manual removal by operating personnel is also possible.

Subsequently, the aircraft (not shown) passes to the station 6.2. This is designed as a combined disembarking station for the disembarking of passengers from the aircraft and unloading station for the unloading of goods for transport from the aircraft. For example, doors of the aircraft may be automatically opened, and/or an access ramp or the like may be deployed. Reference designation 6.2*a* denotes an article to be unloaded, while reference designation 6.2*b* represents a disembarking passenger (arrow P2). In particular, the unloading of articles may in turn be performed in automated fashion by a robot or the like, which is not illustrated in FIG. 2 for the sake of clarity.

The subsequent station 6.3 is a combined embarking station/loading station: as per arrow P3, passengers 6.3*a* embark into the aircraft; furthermore, articles (goods for transport) 6.3*b* can be loaded.

At the station 6.4, there is in turn illustrated a robot or manipulator 6.4*a*, which inserts a (full) power supply unit 6.4*b* into the aircraft as per arrow P4. A manual interaction is likewise possible. Station 6.4 may correspondingly also be referred to as insertion station.

Downstream of station 6.4, the aircraft (not shown) has been loaded and "refueled", and can thus be transported by the third conveying device 5.3 to the takeoff platform 3, in order to participate in flight operation again.

As is also illustrated in FIG. 2 by 4 dashed arrows, the conveying device 5, in the region of the described second conveying device 5.2, may also be subdivided further, or designed to realize discontinuous conveying operation for the aircraft in the protected region 4. In this way, a respective aircraft can remain (stop) for example at the station 6.2 for a certain period of time in order that, in particular, the passengers 6.2*b* can calmly disembark. The same applies with regard to the station 6.3 and the embarking of new passengers 6.3*a*. In this context, it is not necessary for the aircraft to come to a complete stop at the stated stations. Rather, provision may also be made for the second conveying device 5.2 (or the stated partial conveying devices in this region) to adapt the conveying speed to the interaction that is respectively taking place with the aircraft, without the conveying speed decreasing entirely to zero.

As is readily evident, the invention is not restricted to the number, arrangement and combination of stations 6.1 to 6.4 shown by way of example in FIG. 2. Further stations are discussed in detail in the introductory part of the description.

Figure 3:
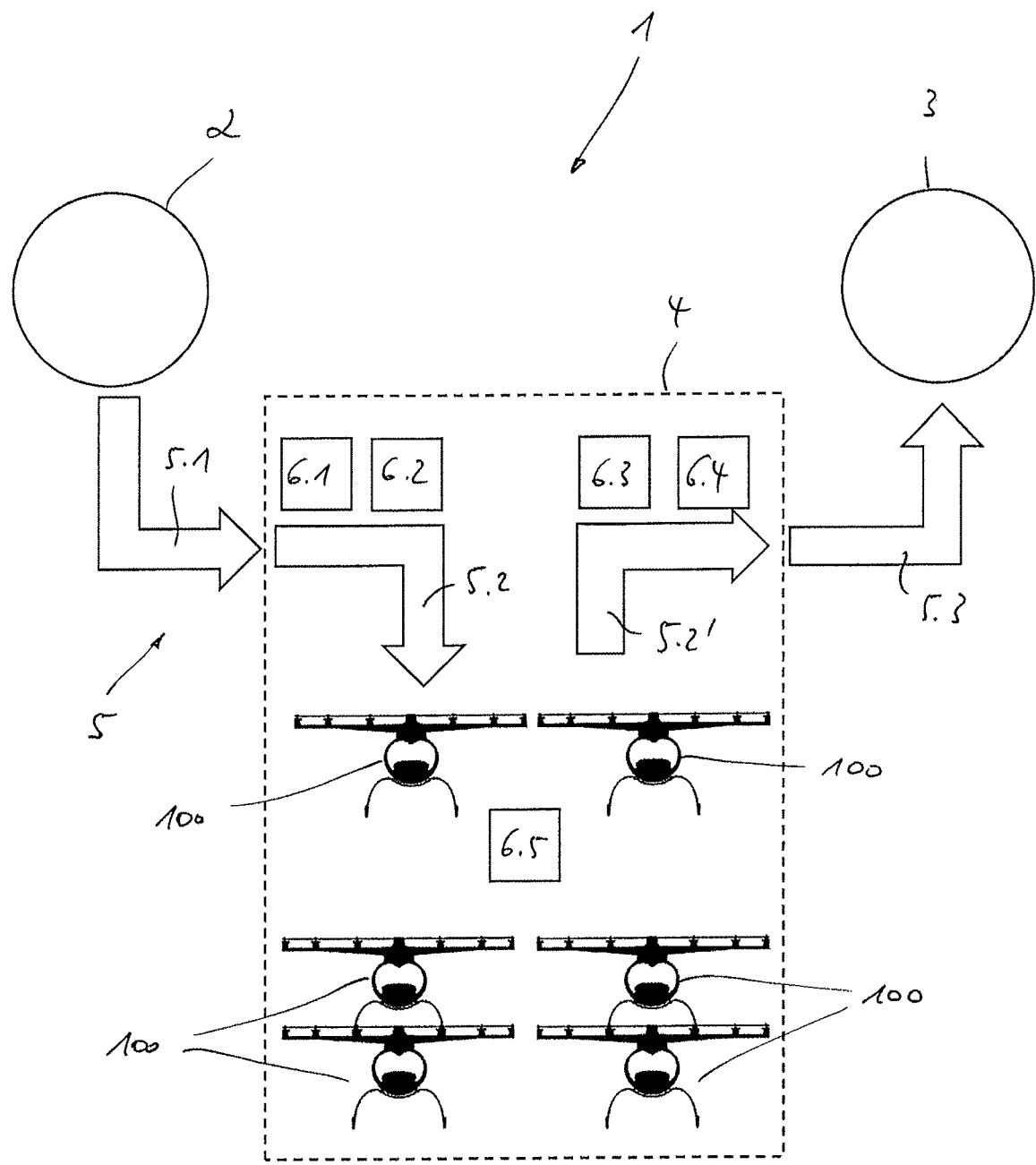
FIG. 3 schematically shows a further embodiment of a ground handling facility according to the invention.

It is also the case in the embodiment as per FIG. 3 that a multiplicity of stations 6.1 to 6.5 is provided in the protected region 4, wherein it is not the intention to discuss the stations 6.1 to 6.4 in any more detail. Also, the conveying device 5 is again of multi-part form (conveying devices 5.1, 5.2, 5.2', 5.3), wherein the conveying devices 5.1 and 5.3 correspond to the conveying devices with the same designation in FIG. 3. In the protected region 4, there are provided two partial conveying devices 5.2, 5.2', as shown, such that the aircraft 100 can, after passing through the station 6.2, be fed to an additional station 6.5. This is, in FIG. 3, a transferring-out and transferring-in station for aircraft 100 out of and into the conveying device 5 respectively. In this way, a landed aircraft 100 can be exchanged for a "fresh" aircraft at the station 6.5. This may take place for example in the event of damage to the aircraft 100, or if the aircraft 100 requires routine maintenance.

The further aircraft 100 shown in the lower part of the protected region 4 may be reserve aircraft or aircraft which have been stored owing to reduced flight operation, for example for weather-related reasons.

Figure 4:
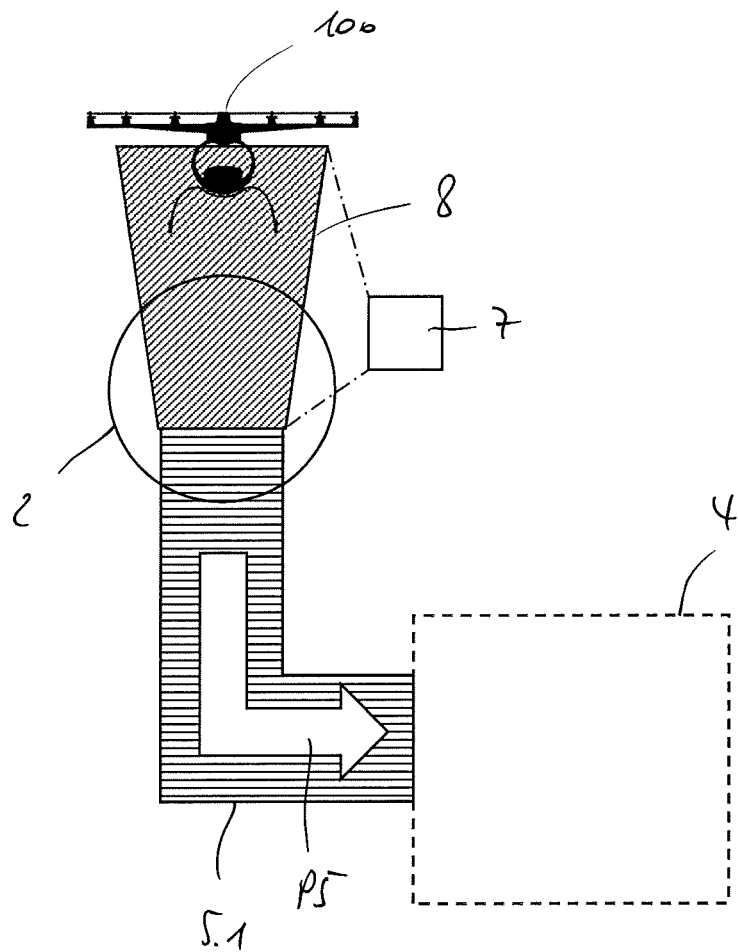
FIG. 4 schematically shows a special embodiment of a ground handling facility according to the invention in the region of the landing platform.

FIG. 4 schematically illustrates a special embodiment of a ground handling facility according to the invention in the region of the landing platform 2. A conveying device 5.1 connects the landing platform 2 to the protected region 4. The block arrow P5 denotes the conveying direction.

In the region of the landing platform 2, there is situated a guiding device 7 which is designed to generate, by contactless electromagnetics, a "guiding field", illustrated here as a frustum, with which control electronics (not shown) of the aircraft 100 interact such that the aircraft 100 lands on the landing platform 2 exactly where it can be taken on and transported away by the conveying device 5.1. It basically falls within the scope of the invention to provide, instead of a contactlessly operating guiding device 7, a type of "capture device" onto which the aircraft 100 docks in order to then be set down on the landing platform 2 in the stated region. This is however more difficult to realize than the above-described contactless guiding device 7, such that the latter is preferred. The use of such a guiding device 7 can ensure that, in the ground handling of aircraft, no delays arise as a result of an aircraft 100 that has landed incorrectly on the platform 2 blocking the flight operation and necessitating an intervention by ground personnel or the like.

Figure 5:
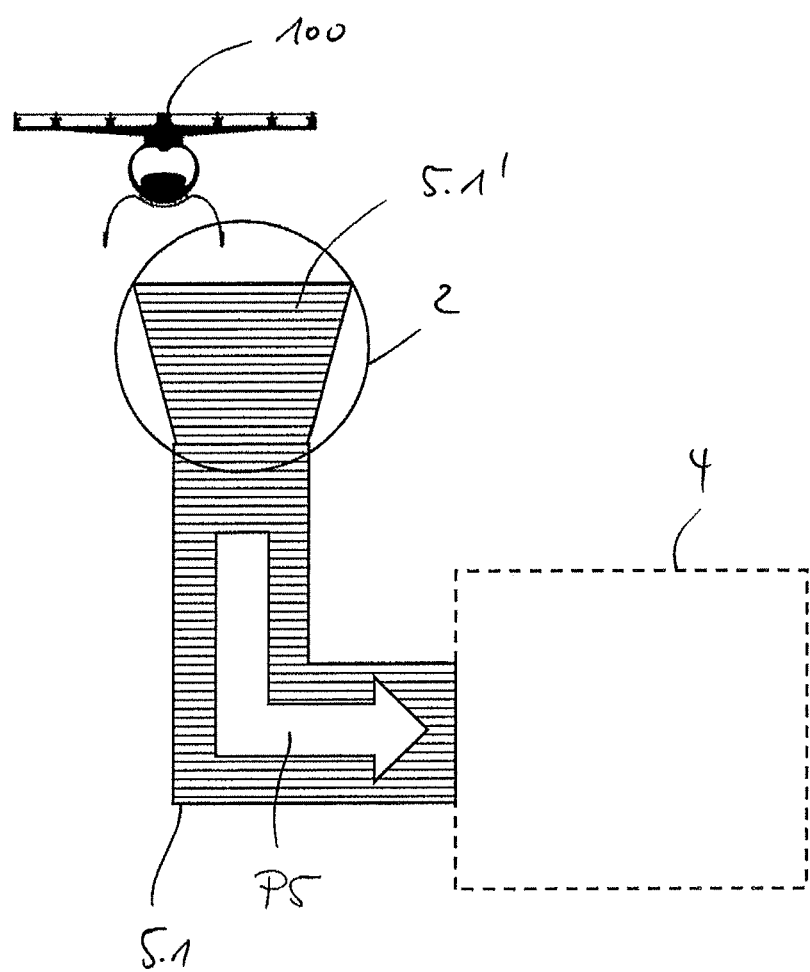
FIG. 5 schematically shows an alternative to the embodiment as per FIG. 4.

FIG. 5 schematically illustrates a different solution to this problem, in the case of which, in the region of the landing platform 2, there is provided an additional conveying device 5.1', specially illustrated using a trapezoidal shape, which covers most of the landing platform 2. In this way, it is no longer of crucial importance where on the landing platform 2 the aircraft 100 sets down. The additional conveying device 5.1' ensures that the landed aircraft 100 can be transported to the first transport device 5.1 and by the latter to the protected region 4.

Figure 6:
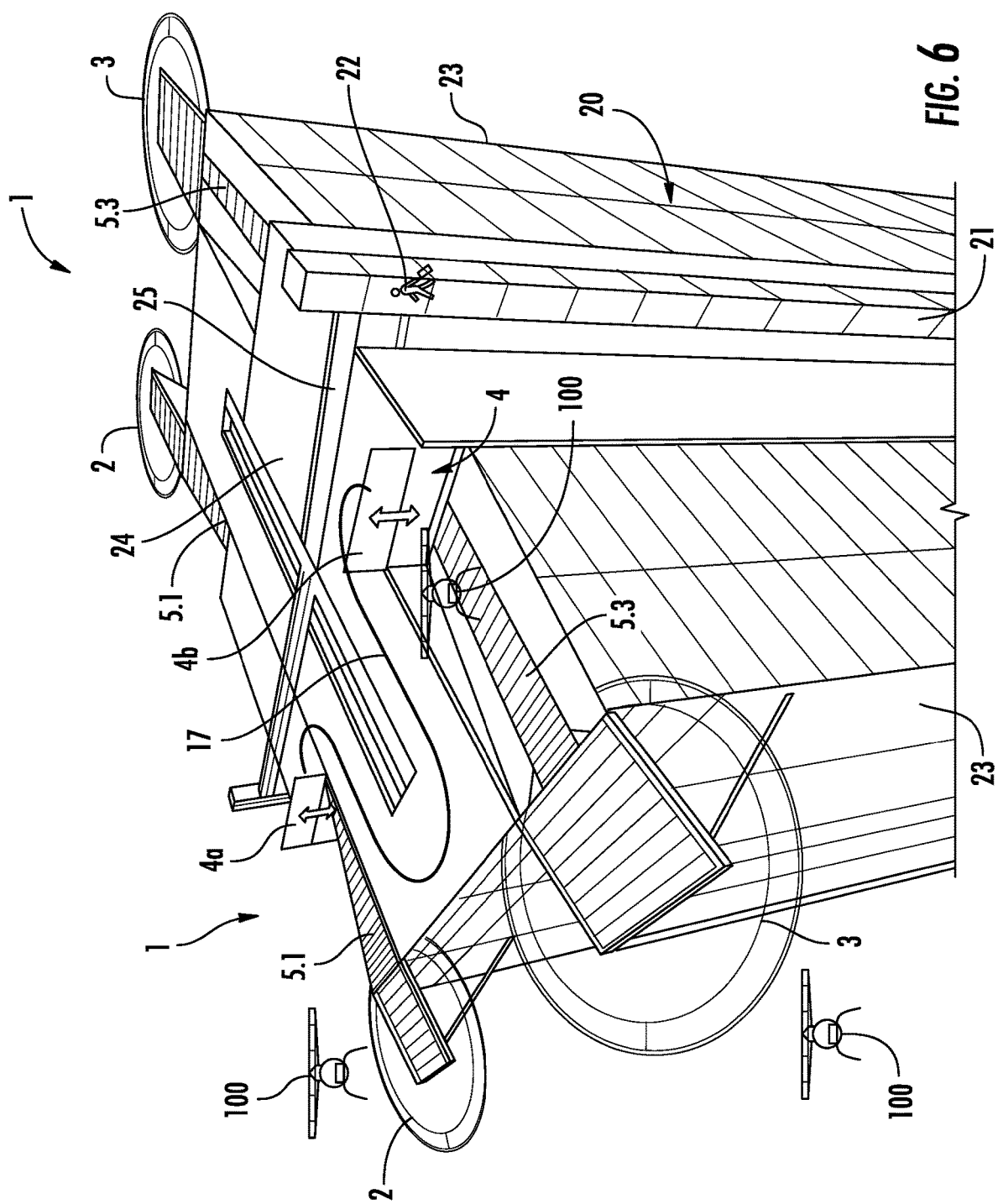
FIG. 6 shows the roof region of a building according to the invention with two ground handling facilities according to the invention.

FIG. 6 illustrates a special embodiment of the ground handling facility 1 according to the invention which is arranged twofold on the roof of a high-rise building. The high-rise building is denoted as a whole by the reference designation 20. It has, on the side, at least one elevator 21 by which passengers 22 can access the ground handling facilities 1. The ground handling facilities 1 have respectively separate landing and takeoff platforms 2, 3, in the manner already depicted. As can be seen from FIG. 6, the landing platforms 2 and the takeoff platforms 3 are of overhanging form in relation to the side walls 23 of the high-rise building 20, in order to reduce the influence of turbulence or the like. Shown by way of example in the region of the foremost takeoff platform 3 is the associated (third) conveying device 5.3, which may be of widened form in the region of the platform 3 itself, as illustrated and as described in principle, with regard to the landing platform 2, on the basis of FIG. 5.

While the platforms 2, 3 are situated approximately on a plane with the actual roof surface 24 of the high-rise building 20, the protected region 4 is situated below said roof surface 24, such that the first and third conveying devices 5.1, 5.3 correspondingly run obliquely downward and obliquely upward respectively. The access to the protected region 4 is closable by gates or shutters 4a, 4b, as is schematically illustrated.

As can be seen from FIG. 6 on the basis of a glass roof section of cross-shaped form, the protected region 4 for the two ground handling facilities 1 that are provided is in each case of meandering form, as shown in the front part of the Figure on the basis of the black line M. The course of the second conveying device 5.2 (not shown) in this region 4 also corresponds. In this way, the aircraft do not pass from the landing platform 2 to the takeoff platform 3 on the shortest direct path, but are rather transported along a longer path M in order to be able, in this way, to provide a multiplicity of interactions with the aircraft 100. Below the cross-shaped glass roof discussed above and denoted by reference designation 25, there may be situated a walkway system for the passengers 22, such that said passengers can access the stations (not shown) provided for them in the protected region 4.

Figure 7:
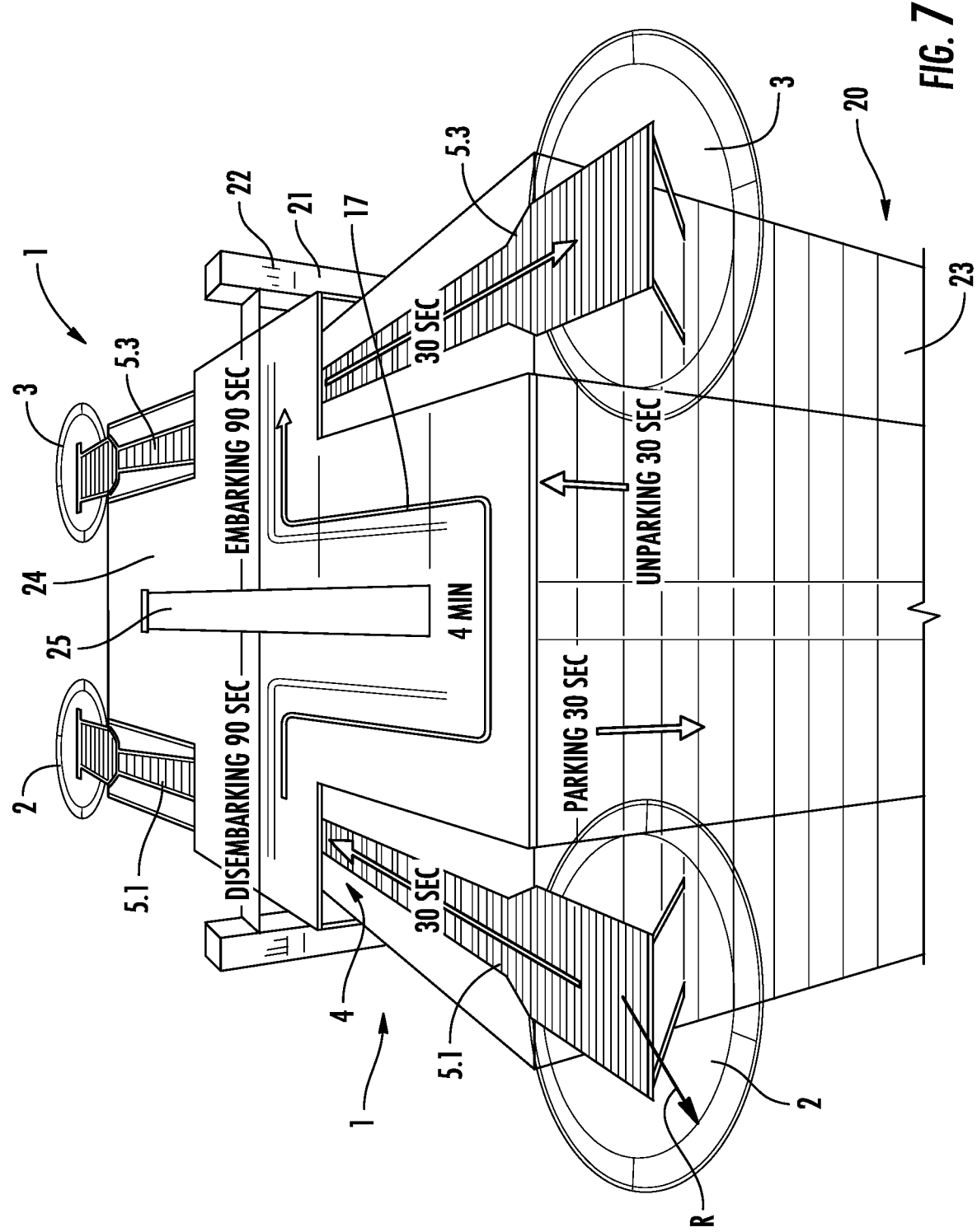
FIG. 7 shows the embodiment substantially as per FIG. 6 from a slightly different perspective.

FIG. 7 shows, from a slightly different perspective, the special embodiment of the invention that has already been described on the basis of FIG. 6. Some exemplary durations for particular subsections of the aircraft ground handling process are stated. For example, provision may be made whereby the transport of an aircraft that has landed on the platform 2 into the protected region 4 by the conveying device 5 takes approximately 30 seconds. Subsequently, in each case 90 seconds are available for the disembarking and the embarking along the meandering path M. The entire residence time of an aircraft in the protected region 4 is intended to amount to approximately 4 minutes, such that a further 2.5 minutes are also available for maintenance, loading and unloading, exchange of the power supply units etc. This has proven to be expedient and efficient. The transport from the protected region 4 to the takeoff platform 3 by the conveying device 5.3 in turn takes approximately 30 seconds. While one or more aircraft are situated in the protected region 4, the takeoff and landing platforms 2, 3 can be used for the landing and takeoff of further aircraft. The flight cycle frequency thus amounts to only 30 seconds.

In FIG. 7, by way of example, the radius of the landing platform 2 is denoted by the reference designation R. This radius may for example amount—without limitation—to approximately 20 meters.

Provision may be made whereby aircraft that are not in use are stored in (underlying) upper levels of the high-rise building 20, in the manner of a parking garage. This is illustrated by way of example in FIG. 7 by the arrows "parking" and "unparking". Such parking and unparking processes are in turn each to be estimated as taking approximately 30 seconds.

The invention claimed is:

1. A ground handling facility (1) for passenger-conveying aircraft (100), comprising:
   at least one first platform, configured as a landing platform (2) for passenger-conveying aircraft (100), wherein
      (a) the at least one first platform is simultaneously configured as a takeoff platform (3) for the passenger-conveying aircraft, or
      (b) at least one second platform is provided which is configured as the takeoff platform (3) for the passenger-conveying aircraft;
   at least one weather protection region (4) which includes a weather protection area for passengers and the aircraft (100);
   at least one conveying device (5; 5.1; 5.2; 5.3) for the aircraft, which is configured to move the aircraft (100) from the landing platform (2) through the at least one weather protection region to the takeoff platform (3);
   said at least one weather protection region (4) including at least the following stations (6; 6.1-6.5) configured for predefined interactions (I) with the aircraft (100):
   a removal station (6.1) configured for removal of at least one power supply unit of the aircraft;
   an insertion station (6.4) configured for insertion of at least one charged or refilled power supply unit of the aircraft;
   a charging station configured for charging or refilling the at least one power supply unit of the aircraft;
   a robot (6.1a. 6.4a) is provided at least at one of the removal station (6.1), which is configured to remove the power supply unit (6.1b) from the aircraft (P1), or at the insertion station (6.4), which is configured to insert the at least one charged or refilled power supply unit in the aircraft; and
   the at least one conveying device (5) is further configured such that a conveying speed thereof is selected such that one of the aircraft (100) is within a first time period removed from the landing platform (2) upon landing to the at least one weather protection region (4); and
   the at least one conveying device (5) is further configured such that the conveying speed thereof is selected so that one of the aircraft (100) is within a second time period conveyed through the at least one weather protection region (4).

2. The ground handling facility (1) according to claim 1, wherein in the weather protection region (4), the stations (6; 6.1-6.5) are provided in series in a conveying direction of the conveying device (5; 5.1; 5.2; 5.3), the stations further include at least a disembarking station (6.2) configured for disembarking of passengers from the aircraft; an embarking station (6.3) configured for embarking of passengers into the aircraft.

3. The ground handling facility (1) as claimed in claim 1, wherein the weather protection region (4) is at least covered by a roof.

4. The ground handling facility (1) as claimed in claim 1, wherein the conveying device (5) comprises a multi-part conveying device (5.1; 5.2; 5.3).

5. The ground handling facility (1) as claimed in claim 4, wherein the multi-part conveying device includes a first conveying device (5.1), a second conveying device (5.2) and a third conveying device (5.3), wherein the first conveying device (5.1) is configured to convey the aircraft (100) from the landing platform (2) to or into the weather protection region (4), the second conveying device (5.2; 5.2') is configured to convey the aircraft (100) through the weather protection region (4), and the third conveying device (5.3) is configured to convey the aircraft (100) out of or from the weather protection region (4) to the takeoff platform (3).

6. The ground handling facility (1) as claimed in claim 5, wherein at least the first conveying device (5.1) and the third conveying device, in comparison to the second conveying device (5.2; 5.2'), have different conveying speeds, with the first conveying device (5.1) and the third conveying device (5.3) having a higher conveying speed than the second conveying device (5.2; 5.2').

7. The ground handling facility (1) as claimed in claim 1, wherein the conveying device (5) is configured to move the aircraft (100) in a continuous manner.

8. The ground handling facility (1) as claimed in claim 1, wherein the conveying device (5) is configured to move the aircraft (100) in a discontinuous manner in the weather protection region (4).

9. The ground handling facility (1) as claimed in claim 1, further comprising a braking device for a non-vertically landing aircraft located in a region of the landing platform (2).

10. The ground handling facility (1) as claimed in claim 1, wherein the weather protection region is arranged on a different horizontal plane than at least one of the takeoff or landing platform (2, 3).

11. The ground handling facility (1) as claimed in claim 1, wherein the ground handling facility is adapted to be on a building (20).

12. The ground handling facility (1) as claimed in claim 11, wherein at least one of the takeoff or landing platform (2, 3) is adapted to be arranged as an overhang in relation to the building (20).

13. The ground handling facility (1) as claimed in claim 1, wherein at least one of the weather protection region (4) or a course of the conveying device (5) in the region, has a meandering (M) form.

14. The ground handling facility (1) as claimed in claim 1, further comprising at least one further station (6.5) configured for removal of the aircraft (100) from the conveying device (5).

15. The ground handling facility (1) as claimed in claim 1, wherein the conveying device (5) comprises at least one of a conveyor belt, a robot, a towing device, a pushing device, or a carriage.

16. The ground handling facility (1) as claimed in claim 1, wherein said first time period is less than one minute.

17. The ground handling facility (1) as claimed in claim 16, wherein said second time period is less than five minutes.

18. The ground handling facility (1) as claimed in claim 1, further comprising a guiding device in the region of the landing platform (2), said guiding device (7) is configured to guide a landing one of the aircraft (100) into a region of action of the conveying device (5).

19. The ground handling facility (1) as claimed in claim 1, further comprising an additional conveying device (5.1') in the region of the landing platform (2), said additional conveying device (5.1') being configured to feed a landed one of the aircraft (100) to the conveying device (5).

20. A building (20), comprising at least one ground handling facility (1) as claimed in claim 1, wherein the ground handling facility (1) is arranged on or in a roof region of the building (20).

21. The building (20) as claimed in claim 20, further comprising an elevator (21) or a staircase as access to the weather protection region (4).

22. The building (20) as claimed in claim 20, wherein there are at least two ground handling facilities (1) which are arranged on mutually opposite sides of the building (20), having respectively separate ones of the takeoff platforms and the landing platforms.

23. The building (20) as claimed in claim 22, wherein the takeoff platforms and the landing platforms (2, 3) are arranged as overhangs in relation to the building (20).

24. A method for the ground handling of passenger-conveying aircraft (100), the method comprising:
i) providing an aircraft (100) on a first platform (2), which serves as a landing platform for a passenger-conveying aircraft (100);
ii) conveying the aircraft (100) from the landing platform (2) into at least one weather protection region (4), which serves as a weather protection area for passengers and the aircraft (100) using at least one conveying device (5) for the aircraft (100);
iii) conveying the aircraft (100) through the weather protection region (4) by the at least one conveying device (5), in which weather protection region (4) predefined interactions (I) with the aircraft (100) takes place at specific stations (6);
iv) conveying the aircraft (100) out of the weather protection region (4) to a takeoff platform (3) for the aircraft (100) by the at least one conveying device (5);
wherein in step iii) at least the following interactions are carried out:
removing at least one power supply unit of the aircraft;
inserting at least one power supply unit in the aircraft;
charging or refilling the at least one power supply unit of the aircraft; and
using a robot (6.1a. 6.4a) for at least one of removing the power supply unit (6.1b) from the aircraft (P1), or inserting the at least one charged or refilled power supply unit in the aircraft.

25. The method as claimed in claim 24, wherein the aircraft (100) is conveyed initially relatively quickly away from the landing platform (2) to the weather protection region (4) or into the weather protection region (4), is subsequently conveyed relatively slowly through the weather protection region (4), and is then conveyed relatively quickly out of the weather protection region (4) or away from the weather protection region (4) to the takeoff platform (3).

26. The method as claimed in claim 24, further comprising removing the aircraft (100) from the landing platform (2), and conveying the aircraft into the weather protection region (4), within a first time starting when said aircraft lands, and said first time is less than one minute.

27. The method as claimed in claim 26, wherein the aircraft (100) is conveyed through the weather protection region (4) within a second time, and said second time is less than five minutes.

28. The method as claimed in claim 24, wherein the aircraft (100) is conveyed through the weather protection region (4) in continuous fashion.

29. The method as claimed in claim 24, wherein the aircraft (100) is conveyed through the weather protection region (4) in discontinuous fashion, with a stoppage or a slowed conveying movement in the region of the at least one station (6).

30. The method as claimed in claim 24, wherein in step iii) additionally carrying out at least one of the following as part of the interactions (I):
embarking of passengers into the aircraft;
disembarking of passengers from the aircraft;
loading of goods for transport into the aircraft;
unloading of goods for transport from the aircraft;
technical maintenance of the aircraft;
transferring of the aircraft out of the conveying device; or
transferring of an aircraft into the conveying device.

31. The method as claimed in claim 24, further comprising guiding a landing one of the aircraft (100) into a region of action of the conveying device (5) by a guiding device (7) located in a region of the landing platform (2).

* * * * *